UNITED STATES PATENT OFFICE.

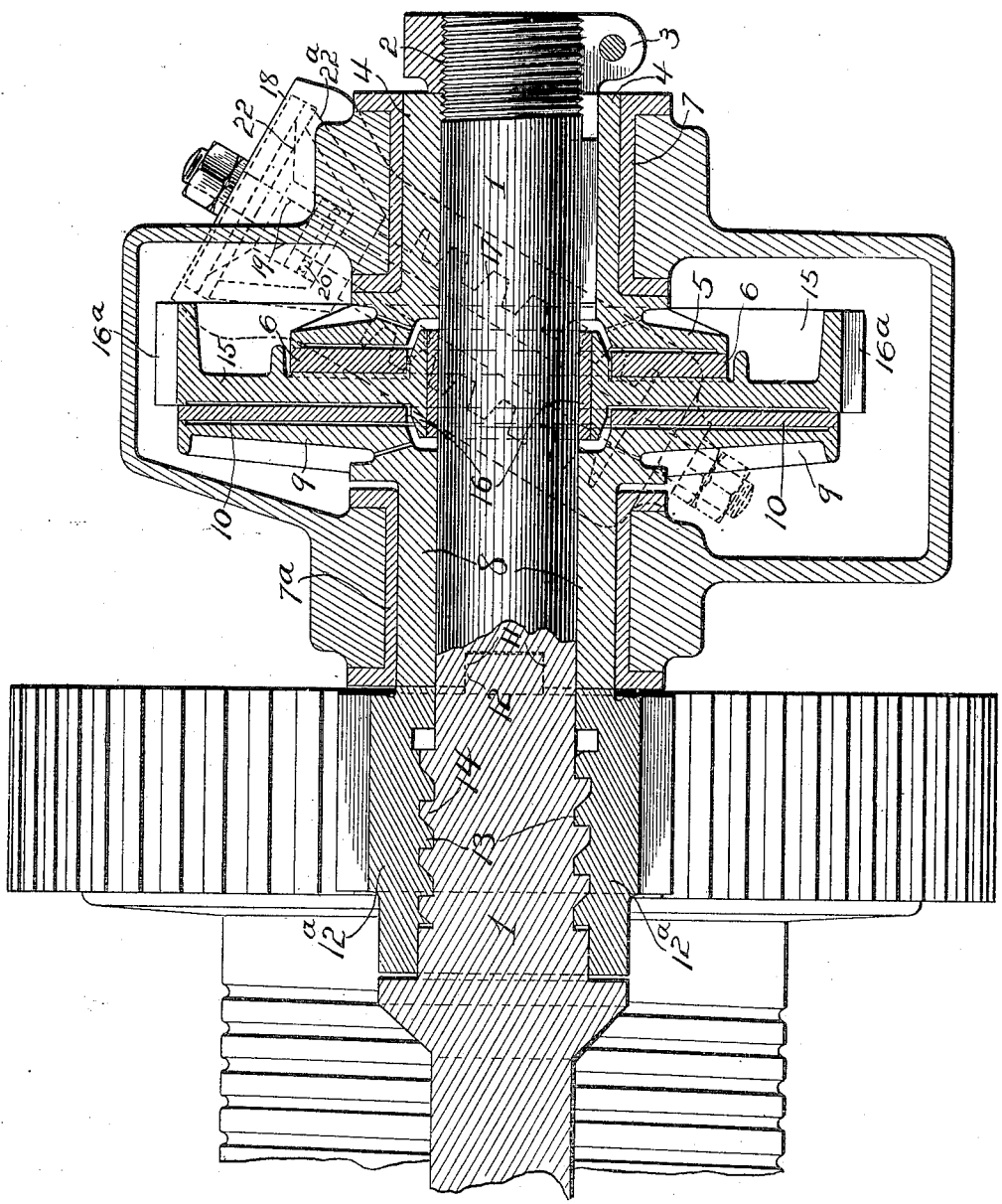

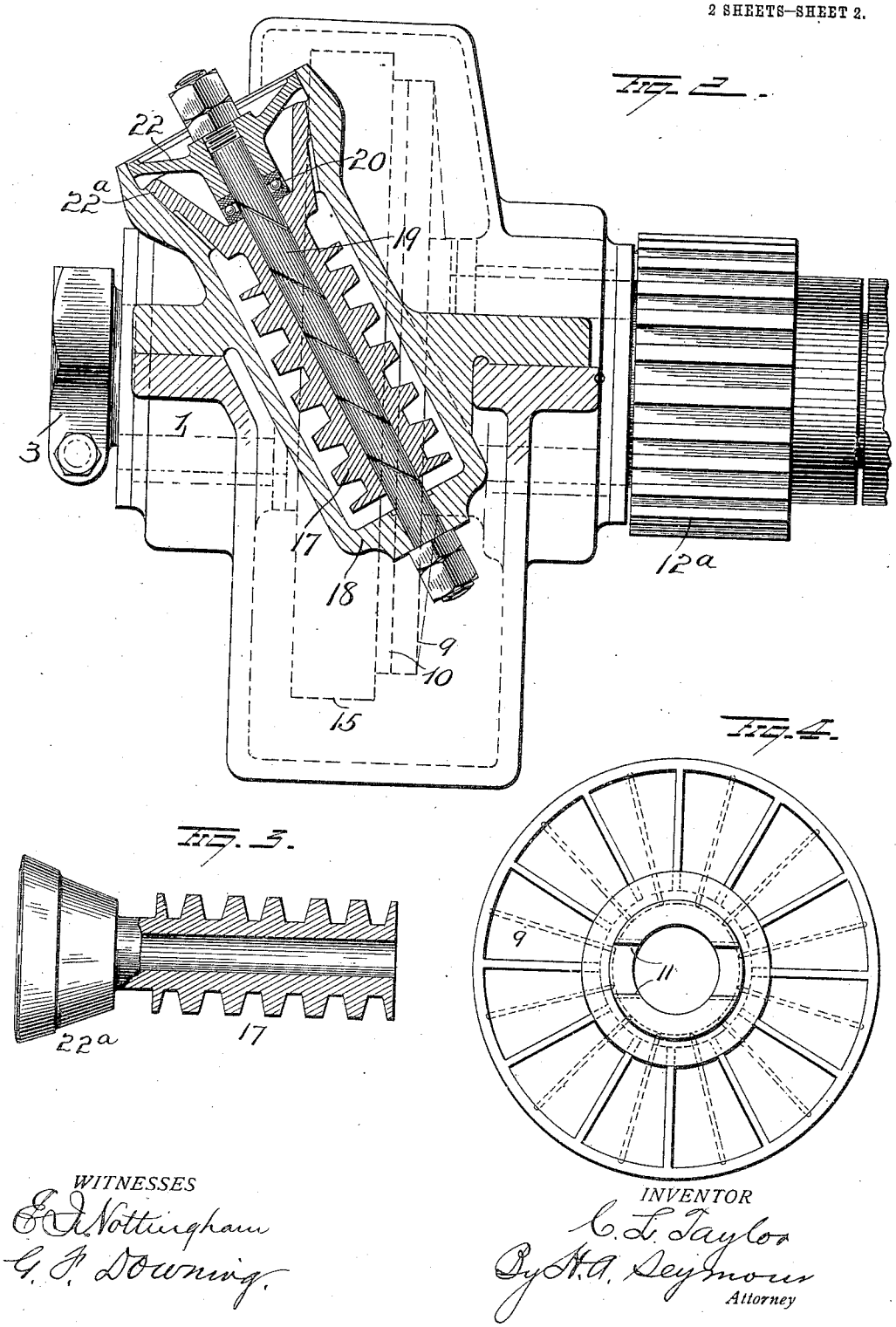

CLARENCE L. TAYLOR, OF ALLIANCE, OHIO, ASSIGNOR TO THE MORGAN ENGINEERING COMPANY, OF ALLIANCE, OHIO.

AUTOMATIC BRAKE.

971,937.     Specification of Letters Patent.     Patented Oct. 4, 1910.

Application filed June 10, 1909. Serial No. 501,423.

*To all whom it may concern:*

Be it known that I, CLARENCE L. TAYLOR, of Alliance, in the county of Stark and State of Ohio, have invented certain new and useful Improvements in Automatic Brakes; and I do hereby declare the following to be a full, clear, and exact description of the invention, such as will enable others skilled in the art to which it appertains to make and use the same.

My invention relates to an improvement in automatic brakes for hoisting machines, and particularly to the brake covered by Patent No. 718,802 granted to The Morgan Engineering Co., January 20th, 1903.

In the brake shown in the patent, the friction ring carries a wheel provided on its periphery with ratchet teeth which are engaged by pawls having friction blocks engaging the sides of the wheel, so that when the hoist drum is turning in one direction, as in lifting the load, the pawls will be moved out of contact with the ratchet teeth and permit the wheel to freely turn, but when the direction of rotation of the hoist drum is reversed as in lowering the load, the pawls will be moved into contact with the teeth on the wheel and lock the latter against movement. With this patented construction there is, owing to the space between the end of the pawl and the nearest tooth on the wheel, more or less short or sudden reverse movement of the wheel and the load, and consequent shock and strain on the hoist cables at the instant the hoisting power is removed from the shaft carrying the wheel, and the object of the present invention is to overcome this objectionable feature by providing means always in engagement with the brake wheel, and operating to lock the latter against reverse movement simultaneously with the cessation of the hoisting power.

With this end in view my invention consists in the parts and combinations of parts as will be more fully explained and pointed out in the claims.

In the accompanying drawings Figure 1 is a view partly in longitudinal section and partly in elevation of the drive shaft and brake. Fig. 2 is a view in elevation of the brake wheel and worm the wheel being shown in dotted lines and the worm in section. Fig. 3 is a view in section of the worm removed and Fig. 4 is a view in elevation of the disk 9.

1 represents a shaft which may be coupled up to any suitable source of power. In overhead traveling cranes, to which class of machines this brake is specially applicable, the shaft 1 would be geared up to the armature shaft of the hoist motor, and drive the hoisting drum, and I will hereinafter refer to the improvement as applied to the hoist mechanism of a crane.

The shaft 1 is provided at its free end with threads 2 for the attachment of the split clamping nut 3, and keyed to the shaft and bearing at one end against said split ring, is the sleeve 4, the latter being provided at its opposite end with the disk 5 carrying the friction blocks 6. This sleeve 4 is mounted in a suitable bearing 7, which with the bearing $7^a$ support the brake mechanism and assist in supporting shaft 1. Loosely mounted on shaft 1 and within bearing $7^a$, is the sleeve 8 having a disk 9 carrying the friction blocks 10. This sleeve 8 is provided at its outer free end with clutch teeth 11 which latter mesh with corresponding clutch teeth 12 (shown in dotted lines Fig. 1) formed integral with the hub of pinion $12^a$. This pinion $12^a$ transmits motion to the hoist drum gearing, and is provided internally with screw threads 13 which mesh with threads 14 formed on the shaft 1, provision being made for slight longitudinal movement of the pinion 12 and sleeve 8 on the shaft 1.

Located intermediate the friction disks 5 and 9 and the friction blocks carried by the latter, is the friction wheel 15 having an enlarged hub 16 snugly embracing the shaft 1, but not keyed thereto. This wheel is provided on its periphery with teeth $16^a$ which latter are engaged by the thread of the worm 17, the latter being mounted in a casing 18, preferably integral with the casing inclosing friction wheel 15, but not necessarily so. This casing 18 is disposed diagonally to the friction wheel as shown in Figs. 2 and 3 and the pitch of the thread on the worm is such, that, when friction wheel 15 is revolving in a direction to hoist its load, the teeth thereon meshing with the worm thread elevates and rotates the worm. This worm is mounted on a fixed shaft 19 carried by the casing 18, and has bearing at its upper end against the ball bearing 20, the latter taking the end thrust of the worm while the friction wheel is turning in a direction to hoist the load.

The teeth on the friction wheel and thread on the worm, are so constructed that they are always in contact, consequently all movements of the friction wheel 15 are responded to instantly by the worm. When therefore the hoisting power is withdrawn, the driving shaft 1 stops, and the load carried by the shaft, tends to rotate the latter in a direction to lower the load, and as the friction wheel 15 will be then clamped between the friction disks, as will be hereinafter explained, the said wheel 15 tends to turn in the reverse direction also. This tendency, or rather the very slight and imperceptible movement of the brake wheel 15 in the reverse direction, acting against the worm, forces the latter downwardly thus bringing its conical section 22$^a$, which in the present instance is shown at the upper end, into contact with the conical section 22 of the casing 18, and absolutely locking the worm against movement in its casing, and locking the wheel 15 against rotation, and as the worm and wheel are always in contact, and the longitudinal movement of the worm is very slight it follows that the braking effect is instantaneous, thus preventing any reverse movement of the hoist drum and consequent strain on the parts carrying the load. The parts are so constructed that when shaft 1 is at rest with a load thereon, the weight of the load acting on the pinion 12, turns the latter on the threaded section of the shaft. This turning movement of the pinion on the threaded section of the shaft, moves the pinion longitudinally into contact with the ends of sleeve 8, thus forcing the friction blocks carried by the disk 9, into contact with the wheel 15, and the latter into contact with the friction blocks on the disk 5, and as the wheel 15 is held against any reverse movement by the worm, it follows that the further rotation of the pinion 14 is prevented. The weight of the load always holds pinion in contact with sleeve 8, and the separation of the friction disks from the wheel in lowering, is just sufficient to permit them to rotate when the wheel 15 is held against movement, hence while there is a very slight rotary and longitudinal movement of pinion 12 on shaft 1 it is really negligible, or imperceptible to the eye.

From the foregoing it is evident that with the load suspended and the shaft 1 at rest, the weight of the load is transmitted directly to the brake, and as the wheel 15 of the latter is positively locked against rotation in the direction to lower the load, the parts will be held against movement. To lower the load, the direction of rotation of the hoist motor and shaft 1, is reversed. This movement of shaft 1 causes the threads thereon acting on the internal threads of pinion 12, to move the latter longitudinally away from sleeve 8, thus relieving the friction of the disks against the wheel which permits the disks to turn with the shaft, the wheel 15 being held against movement by the worm. In order to release the brake for the lowering movement, it is simply necessary to remove the friction, which is accomplished by a very slight movement of disk 9 away from wheel 15, hence the necessary longitudinal movement of pinion 12 on shaft 1 away from sleeve 8, is also very slight. As soon as the friction is released, the pinion 12 tends to race under the influence of the load, but the instant the pinion 14 begins to rotate faster than the shaft 1, the intermeshing threads on the said parts moves the pinion toward sleeve 8 thus applying the brake. These movements of the pinion 12 and sleeve 8 are in rapid succession and practically continuous hence are not noticeable to the eye in the operation of the hoist.

It is evident that many slight changes might be resorted to in the relative arrangement of parts shown and described without departing from the spirit and scope of my invention hence I would have it understood that I do not wish to confine myself to the exact construction and arrangement of parts, shown and described, but Having fully described my invention what I claim as new and desire to secure by Letters-Patent, is:—

1. In an automatic brake, the combination with friction gearing comprising a toothed wheel and friction devices coöperating therewith, of a worm meshing with said toothed wheel, the said worm being free to be rotated by the toothed wheel in one direction, and means for preventing rotation of the worm in the opposite direction.

2. In an automatic brake, the combination with friction gearing comprising a toothed wheel and friction devices coöperating therewith, of a worm meshing with said toothed wheel and having a slight longitudinal movement, the said worm being free to be rotated by the toothed wheel in one direction, and means for locking the worm against rotative movement in the opposite direction.

3. In an automatic brake, the combination with friction gearing comprising a toothed wheel and friction devices coöperating therewith, of a worm meshing with said toothed wheel and freely rotated in one direction by the latter, and having a friction thrust bearing which prevents its rotation in the opposite direction.

4. In an automatic brake the combination with friction gearing comprising a toothed wheel and friction devices coöperating therewith, of a worm meshing with the teeth of said wheel, the said worm having an anti-friction thrust bearing which permits it to be revolved freely in one direction by the toothed wheel, and a friction thrust bearing which prevents it from being revolved in the opposite direction.

5. In an automatic brake, the combination with friction gearing comprising a toothed wheel and friction devices coöperating therewith, of a worm disposed obliquely to the toothed wheel and meshing with and freely revolved by the latter in one direction, and a thrust friction bearing for preventing said worm from rotating in the opposite direction.

6. In an automatic brake the combination with friction gearing comprising a toothed wheel and friction devices coöperating therewith, of a worm meshing with said wheel and freely revolved thereby in one direction, and a casing embracing one end of the worm and having a friction thrust bearing which prevents the worm from rotating in the opposite direction.

7. In an automatic brake, the combination with friction gearing comprising a toothed wheel, and friction devices coöperating therewith, of a worm meshing with and rotated by said toothed wheel, a support for said worm, an anti-friction end thrust bearing against which the worm bears and which permits the worm to be freely rotated by said wheel in one direction, and a friction thrust bearing which prevents rotation of the worm in the opposite direction.

8. In an automatic brake the combination with friction gearing comprising a toothed wheel and friction devices coöperating therewith, of a worm meshing with and rotated by said toothed wheel and provided with a conical portion, and a fixed conical thrust bearing engaged by the conical portion of the worm for locking the latter and the toothed wheel against rotation in one direction.

9. In an automatic brake the combination with friction gearing comprising a toothed wheel and friction devices coöperating therewith of a worm mounted on a fixed shaft and meshing with the teeth on the wheel, the said worm being freely revolved in one direction by said wheel, and means for preventing rotation of said worm in the opposite direction.

In testimony whereof, I have signed this specification in the presence of two subscribing witnesses.

CLARENCE L. TAYLOR.

Witnesses:
WILLIAM E. GABELE,
N. C. FETTERS.